(12) United States Patent
Negrello et al.

(10) Patent No.: US 7,851,964 B2
(45) Date of Patent: Dec. 14, 2010

(54) ELECTRICAL MACHINE CIRCUIT ELEMENT

(75) Inventors: Massimo Negrello, Milan (IT); Gianfranco Gardanini, Milan (IT)

(73) Assignee: Corrada S.p.A., Milan (IT)

(*) Notice: Subject to any disclaimer, the term of this patent is extended or adjusted under 35 U.S.C. 154(b) by 46 days.

(21) Appl. No.: 12/332,852

(22) Filed: Dec. 11, 2008

(65) Prior Publication Data

US 2009/0152977 A1 Jun. 18, 2009

(30) Foreign Application Priority Data

Dec. 13, 2007 (IT) .......................... MI2007A2328

(51) Int. Cl.
*H02K 1/02* (2006.01)

(52) U.S. Cl. .......................... 310/216.017; 310/216.04; 310/216.56

(58) Field of Classification Search .............. 310/216.4, 310/216.7, 216.71, 216.56, 216.48–216.52, 310/216.127, 216.12
See application file for complete search history.

(56) References Cited

U.S. PATENT DOCUMENTS

| | | | | |
|---|---|---|---|---|
| 3,783,317 | A * | 1/1974 | Sisk | 310/212 |
| 5,087,849 | A * | 2/1992 | Neuenschwander | 310/216.013 |
| 5,349,741 | A * | 9/1994 | Neuenschwander | 29/598 |
| 5,365,132 | A * | 11/1994 | Hann et al. | 310/58 |
| 5,859,483 | A * | 1/1999 | Kliman et al. | 310/58 |

* cited by examiner

*Primary Examiner*—Thanh Lam
(74) *Attorney, Agent, or Firm*—Ladas & Parry, LLP

(57) ABSTRACT

An electrical machine circuit element (1) comprises a flat metal sheet (2) provided with a plurality of slots (3) for an electric and/or cooling circuit. The elements (1) presents a plurality of clips (5) which project from the flat metal sheet (2) and a plurality of seats (7) to receive and retain clips (5) of other elements (1), in such a manner as to connect several elements together. Each clip (5) projects from one face of the metal sheet (2) and defines a seat (7) on the opposite face. The clips (5) present an edge (11) facing into the slots (3).

15 Claims, 3 Drawing Sheets

ELECTRICAL MACHINE CIRCUIT ELEMENT

The present invention relates to an element of an electrical machine circuit; in particular, reference will be made hereinafter to stator or rotor circuits of electric motors, transformers, etc.

Electrical machine circuits are currently formed from a plurality of elements in the form of superposed laminations, connected together.

The laminations are typically of circular shape with a central hole and are provided with a plurality of slots which define (when the laminations are superposed) passages for housing electrical circuits or define cooling channels (for example for air passage).

The laminations are connected together by clips with circular arc-shaped edges; these clips cooperate with seats (also provided with circumferential arc-shaped edges) of an adjacent lamination.

Specifically, the clips are inserted as an interference fit into the seats to lock them together.

These described traditional elements present numerous drawbacks, in particular, deformations which are introduced into the laminations when the clips are secured to the seats can be reported; typically these deformations affect the circularity of the central hole of the laminations, which consequently becomes less circular.

Moreover, in punching the clips and seats, reliefs have to be provided (i.e. enlarged apertures positioned at the end of the clip or seat being punched) in order to be able to rotate the superposed laminations through a predetermined angle one to another (operation known as spiraling).

Forming these reliefs causes a reduction in the weight of the laminations and hence a modification of their electrical and magnetic properties. In practice, the reliefs result in a cost increase and a worsening of the motor efficiency.

Moreover, forming the clips and seats with circular arc-shaped edges is very complicated.

The technical aim of the present invention is therefore to provide an electrical machine circuit element which enables the stated technical drawbacks of the known art to be eliminated.

Within the scope of this technical aim an object of the invention is to provide electrical machine circuit elements such as laminations of very precise dimensions even after connecting several laminations together (i.e. after the clips of several laminations have been secured to the seats of other adjacent laminations).

In particular, the circuit elements or laminations of the invention present very precise axial hole circularity and dimensions even after they have been secured together.

Another object of the invention is to provide an electrical machine circuit element in which the provision of the clips and slots does not result in an increase in motor cost and a worsening of its efficiency, as material is not eliminated (with consequent reduction in the weight of a circuit element) to form the relief holes.

Another object of the invention is to provide an electrical machine circuit element in a simple and economical manner.

The technical aim, together with these and other objects, are attained according to the present invention by an electrical machine circuit element in accordance with claim 1.

Other characteristics of the present invention are also defined in the subsequent claims.

Advantageously, according to the invention, the clips are able to be formed even when the circuit elements or laminations are of small dimensions and it is not possible (because of lack of space) to form clips in proximity to their axial hole.

Finally, by virtue of the structure of the circuit elements or laminations of the invention, it is simpler to form the laminations by die-casting an aluminium ring compared with the corresponding traditional circuit elements.

Further characteristics and advantages of the invention will be more apparent from the description of a preferred but non-exclusive embodiment of the electrical machine circuit element according to the invention, illustrated by way of non-limiting example in the accompanying drawings, in which.

Figure 2:
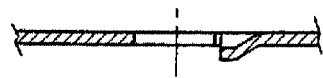
FIG. 2 is a section through a region corresponding with a slot of the element of FIG. 1.
Figure 1:
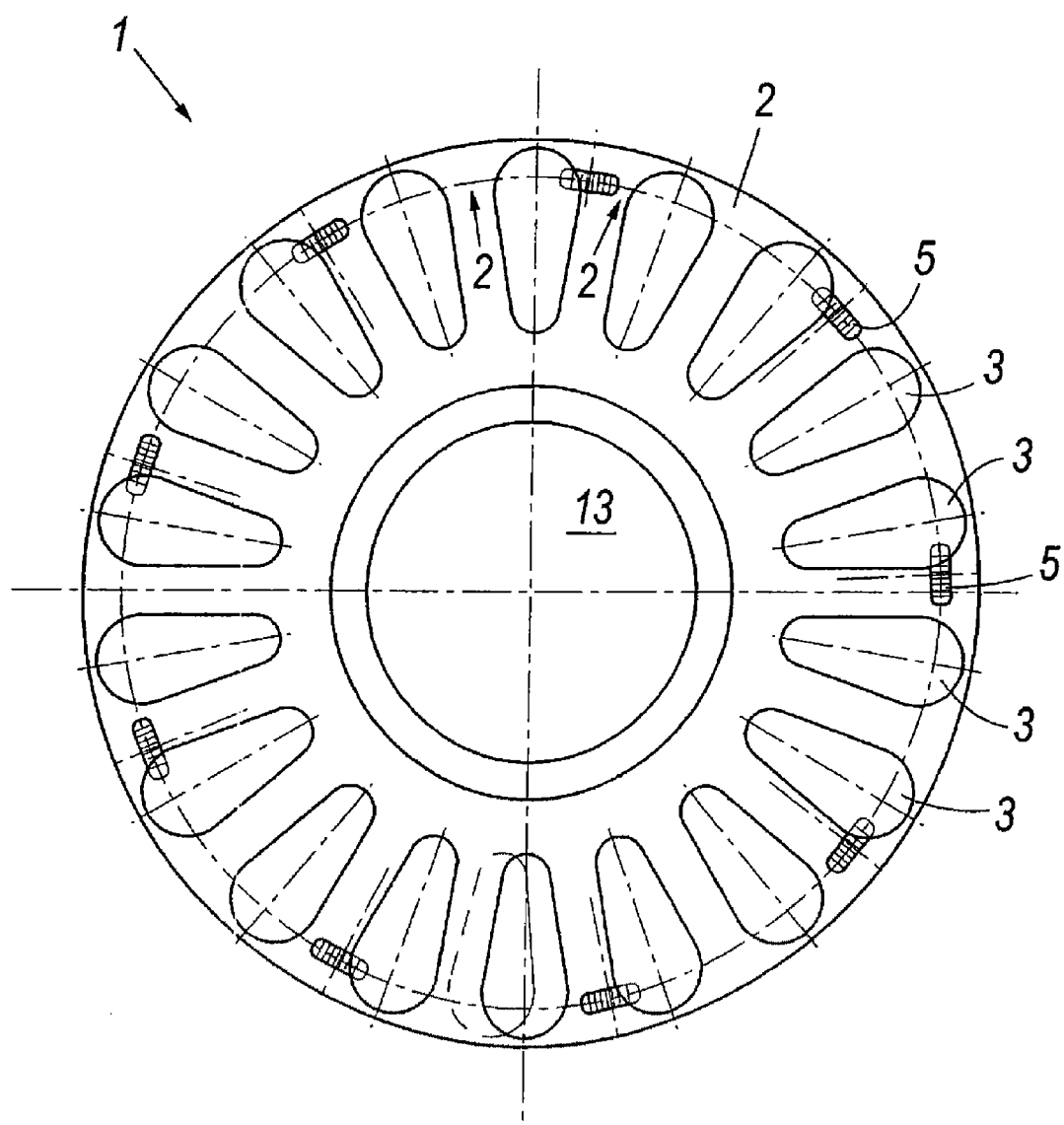
FIG. 1 is a plan view of an electrical machine circuit element according to the invention.
Figure 4:
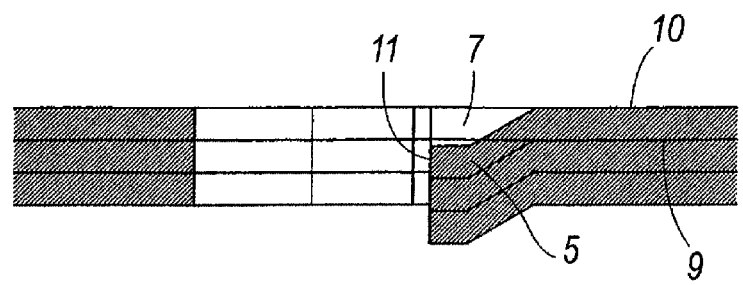
FIG. 4 is a section through a region corresponding with a slot of the pack of FIG. 3.
Figure 3:
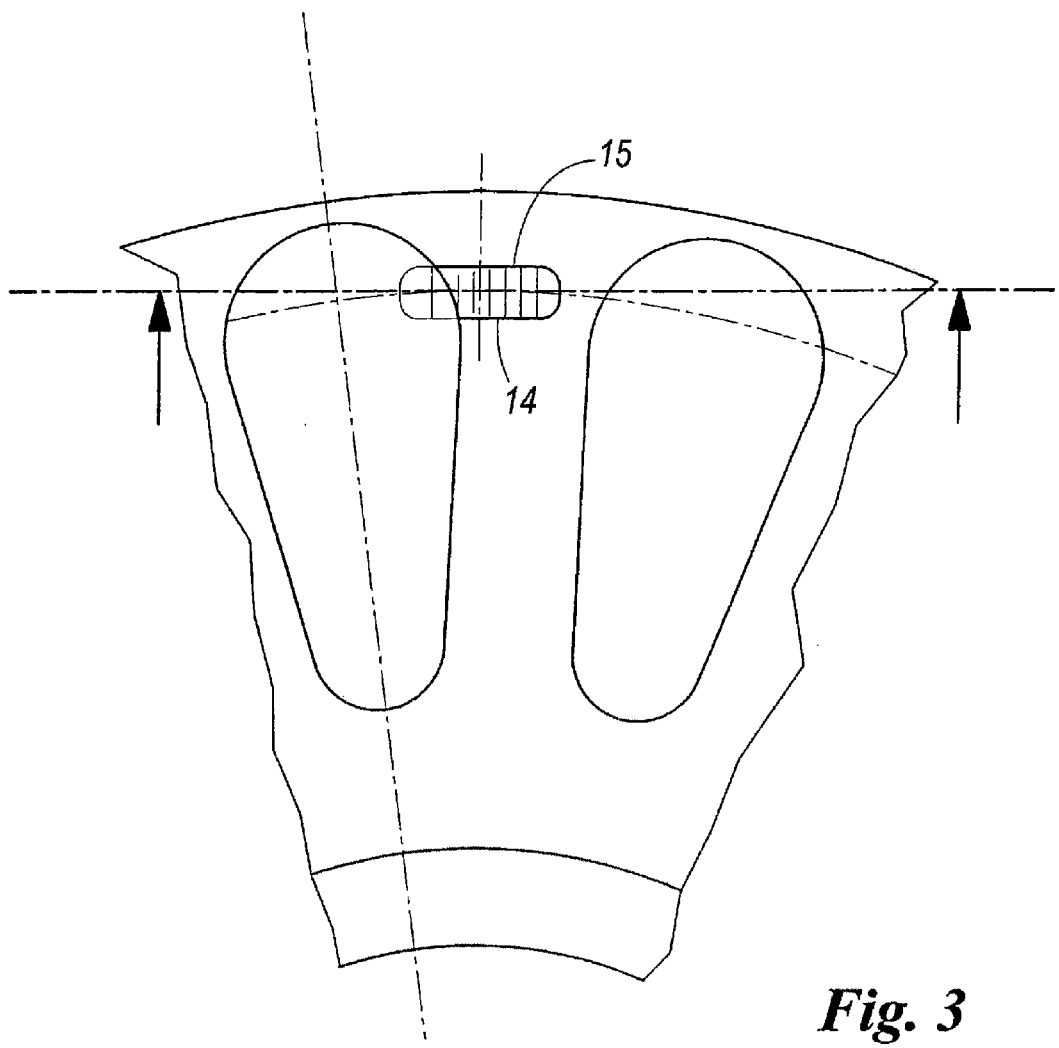
FIG. 3 is an enlarged partial plan view of a pack of elements connected together.

With reference to said figures, these show an electrical machine circuit element indicated overall by the reference numeral 1.

The element 1 comprises a flat metal sheet 2 provided with a plurality of holes or slots 3 for an electrical and/or cooling circuit.

These elements 1 also present a plurality of clips 5 which project from the flat metal sheet and a plurality of seats 7 to receive and retain the clips of other elements 1, in such a manner as to connect several elements together.

Each clip 5 projects from one face 9 of the metal sheet 2 and defines on the opposite face 10 a seat 7; the clips 5 also present an edge 11 facing into the slots 3.

The metal sheet 2 is of circular shape and is provided with a central hole 13, that edge of the clips 5 which faces into the slots 3 being a radial edge. In practice, the clips 5 and the seats 7 are spaced from the central hole 13 and do not influence the dimensions of the hole 13 when they are engaged to secure several elements together.

Figure 5:
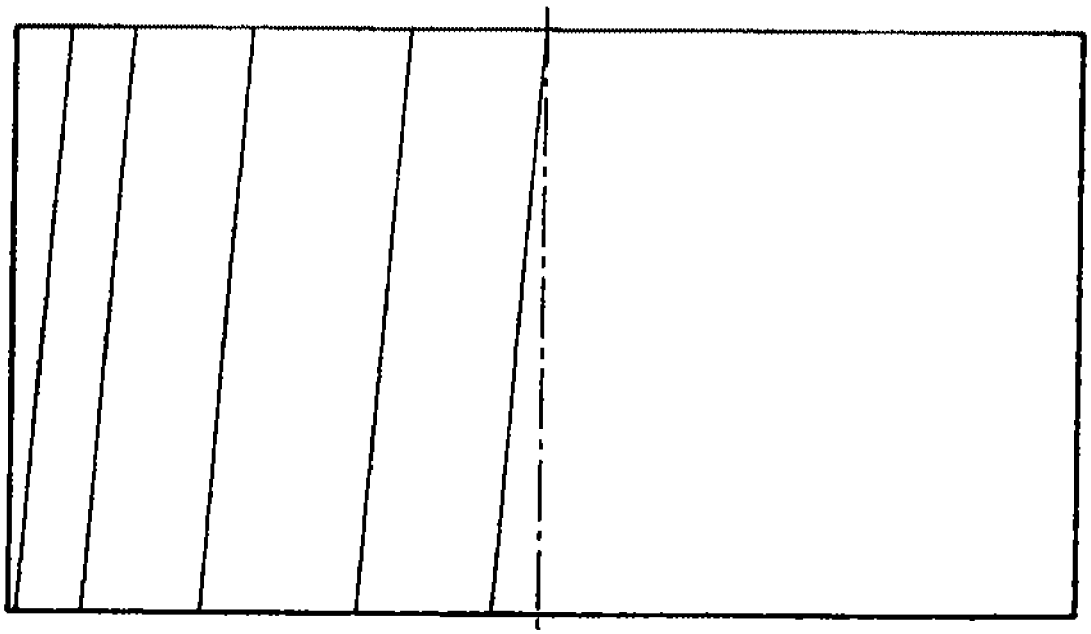
FIG. 5 is a side elevation of the pack of connected-together elements of FIG. 3.

The clips 5 present a profile with an inclined plane facing the same direction as the direction of rotation, or the opposite direction to the spiraling direction; FIG. 5 shows the pack of elements connected together and their spiraling.

The clips 5 interfere with an inner circumferential edge 14 and/or an outer circumferential edge 15 of the seats 7.

Specifically, the clips 5 interfere with that circumferential edge 14, 15 which is opposite that edge the dimension of which is to be maintained exact after connection to other elements 1.

The clips 5 and hence also the seats 7 are of rectangular plan, i.e. the clips 5 and the seats 7 do not present circumferential edges of circular arc shape.

It has been found in practice that the electrical machine circuit element of the invention is particularly advantageous as it enables the efficiency of electrical machines to be improved and their production cost limited.

The electrical machine circuit element conceived in this manner is susceptible to numerous modifications and variants, all falling within the scope of the inventive concept; moreover all details can be replaced by technically equivalent elements.

In practice, the materials used and the dimensions can be chosen at will according to requirements and to the state of the art.

The invention claimed is:

1. An electrical machine circuit element comprising
a flat metal sheet provided with a plurality of radially extending oblong slots for an electrical and/or cooling circuit, said elements comprising
   a plurality of clips which project from said flat metal sheet and
   a plurality of seats to receive and retain clips of other elements, in such a manner as to connect several elements together,
   wherein each clip projects from one face of said metal sheet and defines on the opposite face a seat, said clips comprising an edge facing into said radially extending oblong slots.

2. The element as claimed in claim 1, wherein said metal sheet is of circular shape and is provided with a central hole.

3. The element as claimed in claim 1, wherein the edge of said clips which faces into the slots is a radial edge.

4. The element as claimed in claim 1 wherein that said clips have a profile with an inclined plane.

5. The element as claimed in claim 1, wherein said clips interfere with an inner and/or outer circumferential edge of said seats.

6. The element as claimed in claim 1, wherein said clips interfere with a circumferential edge which is opposite that edge the dimension of which to be maintained exact after connection to other elements.

7. The element as claimed in claim 1, wherein said clips and hence also said seats have a rectangular plan.

8. The element as claimed in claim 1, wherein the radially extending oblong slots have a substantially tear-drop shape.

9. The element as claimed in claim 1, wherein said clips extend transversally to a respective radially extending oblong slot.

10. The element as claimed in claim 1, wherein said radially extending oblong slots are separated one from another by radial arms, and said clips are arranged on a respective radial arm.

11. The element as claimed in claim 1, wherein said clips extend transversally to their respective radial arms.

12. The element as claimed in claim 1, wherein said radially extending slots are arranged around a central hole and form a distal end and a proximal end, the distal end are farther from the central hole, the proximal end are closer to the central hole, and said clips are arranged at or closer to the distal end of a respective radially extending oblong slots than to the proximal end of that slot.

13. An electrical machine comprising:
a plurality of circuit elements according to claim 1 and stacked so as to form a pack; and
an electrical or cooling circuit comprising at least part of the radially extending oblong slots of the circuit elements.

14. The electrical machine according to claim 13, wherein the radially extending oblong slots of the stacked circuit elements are aligned so as to form a plurality of through ducts, and said clips comprise a respective edge facing into a respective through duct.

15. An electrical machine circuit element comprising:
a lamination provided with a plurality of slots for an electrical and/or cooling circuit, said elements comprising
   a plurality of clips projecting from said lamination and
   a plurality of seats to receive and retain clips of other elements, in such a manner as to connect several elements together,
   wherein each clip projects from one face of said lamination and defines on the opposite face one of the plurality of seats, said clips comprising an edge facing into one of said plurality of slots.

* * * * *